(12) United States Patent
Auray et al.

(10) Patent No.: US 6,916,988 B1
(45) Date of Patent: Jul. 12, 2005

(54) ELECTRICAL CONNECTOR WITH FRUSTRO CONICAL SNAP FIT RETAINING RING

(75) Inventors: Delbert Auray, Southport, CT (US); Kenneth M. Kiely, Milford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

(21) Appl. No.: 10/939,619

(22) Filed: Sep. 13, 2004

Related U.S. Application Data
(60) Provisional application No. 60/587,121, filed on Jul. 12, 2004.

(51) Int. Cl.[7] .................................................. H02G 3/06
(52) U.S. Cl. ................. 174/65 R; 174/65 G; 174/68.1; 174/68.3; 174/72 C; 174/69; 174/70 R; 174/71 R
(58) Field of Search ........................... 174/65 R, 65 G, 174/68.1, 68.3, 72 C, 69, 70 R, 71 R

(56) References Cited

U.S. PATENT DOCUMENTS

| | | |
|---|---|---|
| 1,483,218 A | 2/1924 | Fahnestock |
| 1,725,883 A | 8/1929 | Recker |
| 1,830,250 A | 11/1931 | Tiefenbacher |
| 2,156,003 A | 4/1939 | Tinnerman |
| 2,160,353 A | 5/1939 | Conners |
| 2,445,663 A | 7/1948 | Peters |
| 2,744,769 A | 5/1956 | Roeder et al. |
| 2,823,932 A | 2/1958 | Schigut |
| 3,183,297 A | 5/1965 | Curtiss |
| 3,436,105 A | 4/1969 | Miklya |
| 3,544,705 A | 12/1970 | Winston |
| 3,631,738 A | 1/1972 | Harper |
| 3,788,582 A | 1/1974 | Swanquist |
| 3,814,467 A | 6/1974 | Van Buren, Jr. |
| 3,858,151 A | 12/1974 | Paskert |
| 3,993,333 A | 11/1976 | Biswas |
| 4,012,578 A | 3/1977 | Moran et al. |
| 4,021,604 A | 5/1977 | Dola et al. |
| 4,032,178 A | 6/1977 | Neuroth |
| 4,248,459 A | * 2/1981 | Pate et al. ................... 285/319 |

(Continued)

Primary Examiner—Dean A. Reichard
Assistant Examiner—Anton Harris
(74) Attorney, Agent, or Firm—Fattibene & Fattibene; Arthur T. Fattibene; Paul A. Fattibene

(57) ABSTRACT

An electric connector assembly that includes a connector body having an inlet end portion and an outlet end portion that is provided with a frustro-conical snap fit retaining ring having a face portion about which laterally extending arms are bent to define a frustro-conical ring circumscribing the face portion. The retainer ring is integrally formed of a spring steel type material an equivalent thereof. Certain of the arms have locking tangs formed or blanked out of the surface thereof, that are cantileverly bent or offset relative to the surface of its corresponding arm. The free end of the arms are arranged to function as an electrical grounding tang in the operative position of the connector assembly.

The retainer ring is readily formed from a blank of sheet material that is initially cruciform in shape and which can then be readily shaped to define a retainer ring having a face portion and laterally bent or folded a circumscribing frustro-conical retaining ring from which the locking tangs and grounding tangs are integrally formed.

10 Claims, 3 Drawing Sheets

U.S. PATENT DOCUMENTS

| | | |
|---|---|---|
| 4,361,302 A | 11/1982 | Lass |
| 4,468,535 A | 8/1984 | Law |
| 4,619,332 A | 10/1986 | Sheehan |
| 4,621,166 A | 11/1986 | Neuroth |
| 4,626,620 A | 12/1986 | Plyler |
| 4,657,212 A | 4/1987 | Gilmore et al. |
| 4,711,472 A | 12/1987 | Schnell |
| 4,773,280 A | 9/1988 | Baumgarten |
| 4,880,387 A | 11/1989 | Stikeleather et al. |
| 4,981,310 A | 1/1991 | Belisaire |
| 4,990,721 A | 2/1991 | Sheehan |
| 5,132,493 A | 7/1992 | Sheehan |
| 5,171,164 A | 12/1992 | O'Neil et al. |
| 5,189,258 A | 2/1993 | Pratesi |
| 5,266,050 A | 11/1993 | O'Neil et al. |
| 5,342,994 A | 8/1994 | Pratesi |
| 6,380,483 B1 | 4/2002 | Blake |
| 6,444,907 B1 | 9/2002 | Kiely |
| 6,476,322 B1 * | 11/2002 | Dunne et al. ............... 174/68.1 |
| 6,768,057 B2 | 7/2004 | Blake |

* cited by examiner

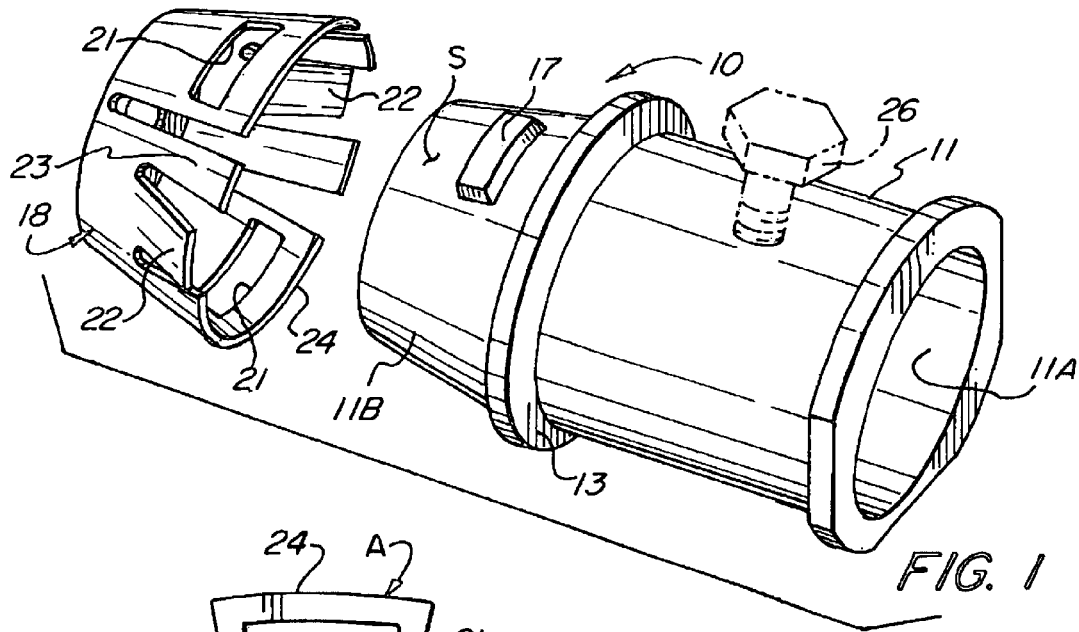
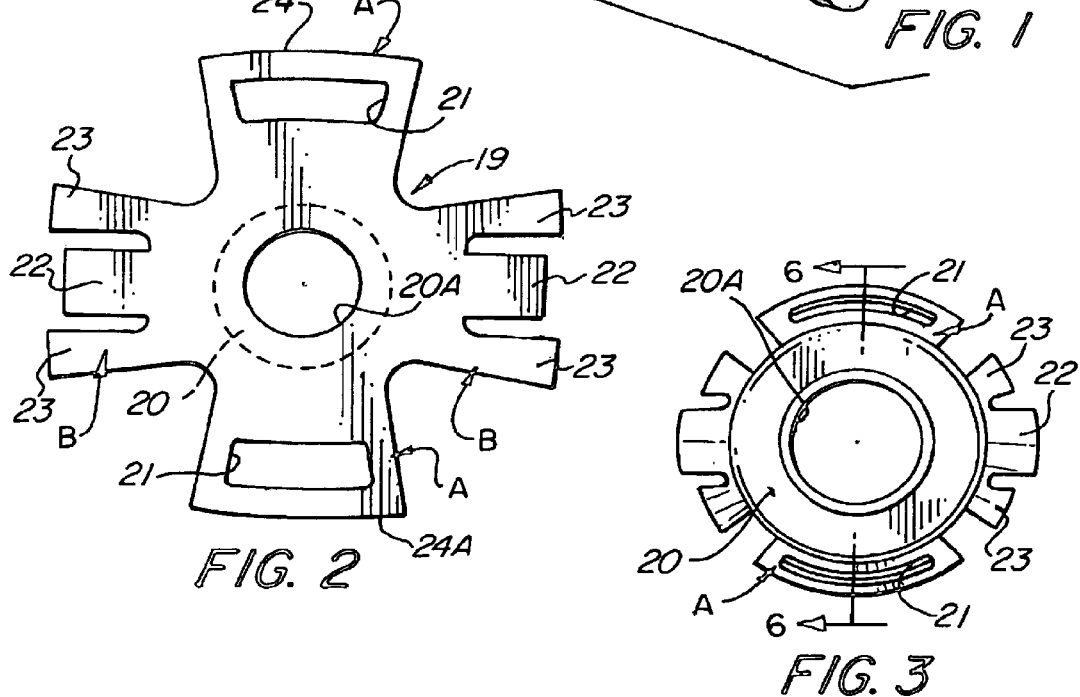
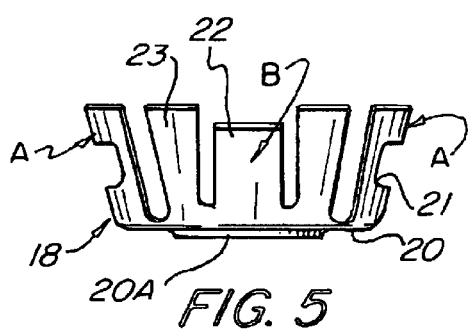

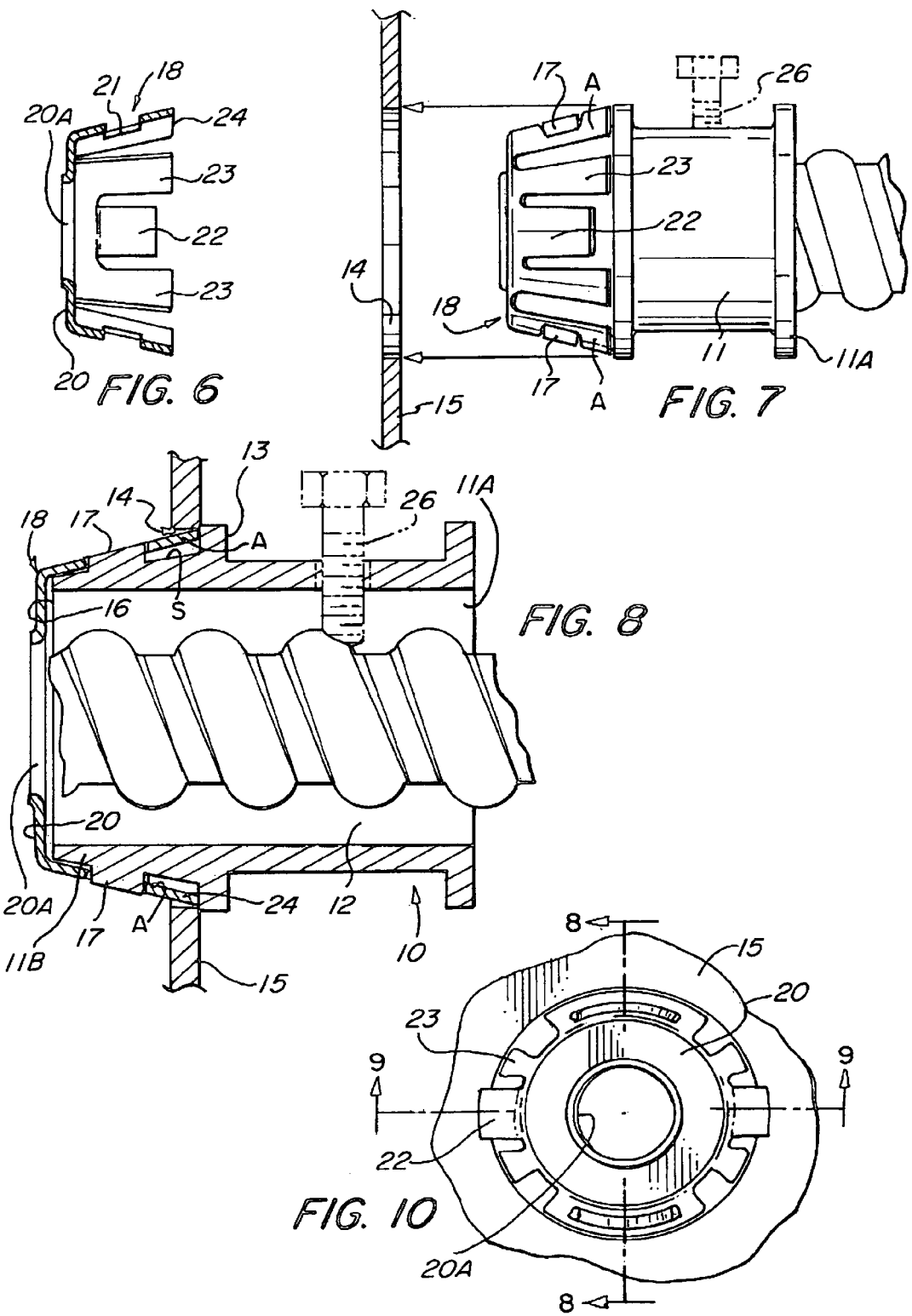

ELECTRICAL CONNECTOR WITH FRUSTRO CONICAL SNAP FIT RETAINING RING

RELATED APPLICATIONS

This application discloses a further advancement in the field of electrical connector assemblies having a snap fit retaining ring circumscribing the outlet end of a connector body for effecting a snap fit connection to an electrical box of the types described in the co-pending application Ser. No. 10/283,978 filed Oct. 20, 2002 for Snap Fitting Electrical Connector; co-pending application Ser. No. 10/790,283 filed Mar. 1, 2004 for Snap Fitting Electrical Connector; and in a co-pending Provisional Application Ser. No. 60/587,121 filed Jul. 12, 2004, which are incorporated herein by reference.

FIELD OF INVENTION

This invention relates to a snap fit electrical connector for connecting an electrical conductor to an electrical box, and more specifically to an electrical connector having a detachable snap fit, retaining ring having a face portion and a generally frustro-conical shape circumscribing the face portion and having integrally formed thereon a series of resilient locking tangs and grounding tangs.

BACKGROUND OF THE INVENTION

Electrical connectors are commonly used for attaching electrical conductors, cables, wires, electrical metal tubing or the like to an electric box, e.g. a junction box, outlet box, switch box or other similar type of electric box. Such known electrical connectors are either of a type that are secured to an electric box by a threaded lock nut or by means of a circular snap fit retaining ring of the type disclosed on the above identified co-pending applications or as disclosed in U.S. patents, such as U.S. Pat. Nos. 6,444,907; 5,189,258; 5,266,050; 5,171,164; 2,744,769 and 1,483,218 for example. Reference is also made to U.S. Pat. No. 6,768,057 which is directed to a right angle type connector formed of a pair of sheet metal stampings fitted together and secured to an electrical box with a snap fit arrangement. Connectors formed as connector caps which are adapted to be fitted over the end of a conductor, cable or wires, such as disclosed in U.S. Pat. No. 4,880,387, are also known. While such prior known connectors can be satisfactorily used for their intended purposes, efforts are constantly being made to improve upon the known electrical connectors. The disclosure herein comprises another effort to advance or improve the manner of forming and/or securing an electrical connector to an electric box by a snap fit action.

SUMMARY OF THE INVENTION

An object of this invention is to provide an electrical connector with a frustro-conically shaped retaining ring having integrally formed locking tangs and electrical grounding tangs.

Another object of this invention is to provide for an electrical connector assembly that includes an electrical connector body having an outlet end portion having a complementary frustro-conical retaining ring that is readily fitted to and retained on the outlet end portion of the connector body.

Another object is to provide a connector assembly comprising a connector body having an outlet portion free of any retaining flanges and an associated snap fit retainer ring circumscribing the outlet end portion.

Another object is to provide a retaining ring having a face portion with outwardly flaring circumscribing arms or sides having locking and grounding tangs that are readily formed out of a surface of the respective arms or side.

Another object is to provide a retaining ring having a frustro-conical shape with a first series of tangs for securing the retaining ring relative to an electrical box and a second series of tangs for effecting a positive electrical ground with an associated electrical box when fitted onto the end of a connector body.

Another object is to provide a frustro-conically shaped retaining ring that can be readily formed from a blank of spring steel.

Another object is to provide or an electrical connector assembly that is relatively simple to fabricate and positive in operation.

The foregoing objects and other features and advantages are attained by an electrical connector assembly that includes a connector body having an inlet end portion for receiving an electrical conductor and an outlet portion which is adapted to be inserted through a knockout hole of an electric box, e.g. an electric outlet box or the like. A radially outwardly extending flange circumscribes an intermediate portion of the connector body to function as a stop to limit the insertion of the outlet end portion of the connector body through the knockout hole of an electric box. The outlet end portion may be provided with an outer surface that converges or tapers inwardly toward the outlet opening thereof. Formed on the surface of the outlet end portion are one or more retaining lugs, which may be circumferentially spaced about the outlet end portion. A frustro-conically shaped snap ring is fitted onto the outlet end portion.

In accordance with this invention, the retaining ring, which is initially formed from a blank of sheet material having a cruciform shape, has a face portion with a central opening wherein the radiating arms of the cruciform blank are disposed about the face portion to define a frustro-conical ring. The ring so formed is provided with a blanked out or die cut tangs to define locking tangs and grounding tangs. The frustro-conical ring so formed also has a slot adapted to receive the retaining lug when the retaining ring is fitted onto the outlet end portion of the connector body so that the free ends of the ring engage the inner periphery of the knockout hole of an electric box for electrical continuity and grounding.

To form the retaining ring, the cruciform arms are arranged to be folded relative to the front or face forming portion of the blank provided with a central opening to define a unitary frustro-conically shaped cup-like member to compliment or be fitted to the outlet end portion of the connector body. The retaining ring thus formed is fitted over or onto the outlet end portion whereby the retaining slot formed in the ring of arms is adapted to receive the complementary retaining lug formed on the surface of the outlet end portion for retaining the ring on the outlet end portion of the connector body.

With the construction described, the connector assembly can be readily inserted through the knockout opening of an electric box wherein the locking tangs will spring outwardly to lock the connector assembly to the electric box with the grounding tangs or free ends of the arms being biased or urged against the internal periphery of the knockout hole to effect a positive electric ground, due to the inherent resiliency of the respective tangs and the material from which they are formed.

IN THE DRAWINGS

FIG. 1 is an exploded perspective view of the electrical connector assembly.

FIG. 2 is a plan view of the blank from which the retaining ring of the present invention is formed.

FIG. 3 is a detail front view of the retainer ring.

FIG. 4 is a detail side view of the retaining ring.

FIG. 5 is a detail end view of FIG. 4.

FIG. 6 is a sectional view of the retainer ring taken along line 6—6 on FIG. 3.

FIG. 7 is a side view of the connector assembly illustrating the alignment thereof relative to the knockout opening of an electric box.

FIG. 8 is a section side view illustrating the connector assembly secured to an electric box, and taken along line 8—8 on FIG. 10.

FIG. 10 is a fragmentary front view of the connector assembly secured to an electric box as viewed from the inside of the box.

DETAILED DESCRIPTION

Figure 9:
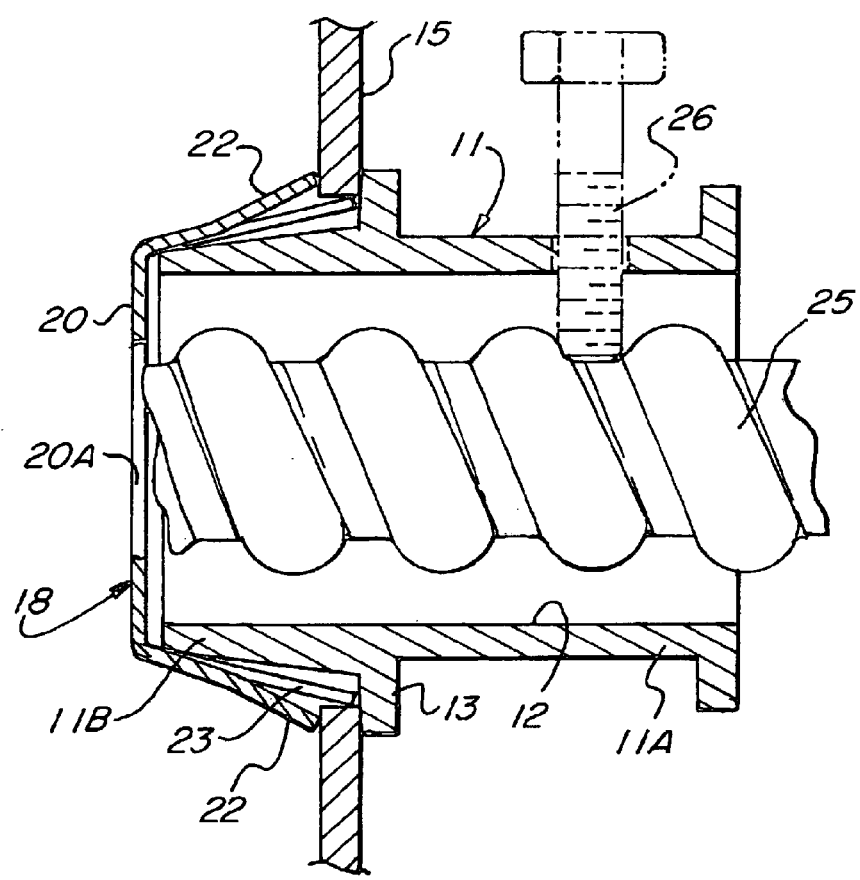
FIG. 9 is a sectional side view taken along line 9—9 on FIG. 10.

Referring to the drawings, there is shown in FIG. 1 an electrical connector assembly 10. The connector assembly 10 includes a connector body 11, which is usually formed of metal casting, e.g. zinc or other suitable metallic alloy. The connector body 11 is formed with an inlet end portion 11A and an outlet end portion 11B and having a bore 12 extending therethrough. Intermediate the connector body 11 or between the inlet end portion 11A and outlet end portion 11B there is provided a radially outwardly extending flange 13 which functions as a stop to limit the amount that the connector body 11 may be inserted through the knockout hole 14 of an electric box 15, as noted in FIG. 8.

As shown in FIGS. 1 and 8, the outer surface S of the outlet end portion 11B slopes, tapers or converges toward the outlet opening 16 whereby the outer surface S of the outlet end portion 11B has a generally frustro-conical configuration. Formed on the surface S of the outlet end portion 11B is an outwardly projecting retainer lug 17. In the illustrated embodiment, two such lugs 17 are shown disposed 180° apart about the outer circumference of the outlet end portion 11B.

The connector assembly 10 also includes a snap fit retaining ring 18. In accordance with this invention, the retaining ring 18 is integrally formed from a blank 19 of spring steel material. As best seen in FIG. 2, the blank 19 is initially formed or stamped to define a generally cruciform shape. The cruciform shape is provided with a face portion 20 having central opening or hole 20A and having four generally radially extending arms defining two pairs of oppositely disposed arms AA and BB.

As illustrated in FIG. 2, the opposed pair of arms AA are each provided with a retaining slot 21. The opposed pair of arms BB, as best seen in FIG. 8, are blanked or formed to define a locking tang 22 and to either side thereof an electrical grounding tang 23, 23. As shown, the locking tang 22 is slightly shorter than the adjacent grounding tangs 23, 23. The arrangement is such that the free end of the locking tangs 22 are formed so as to engage the inside surface of the electric box 15 in the assembled portion, as best seen in FIG. 9, to secure the connector assembly 10 to the electric box 15 and prohibit any unintentional withdrawal of the connector assembly 10 from the electrical box 15, whereas the free ends of the grounding tangs 23 are biased in engagement with the internal periphery of the knockout hole 14. Also, the free ends 24, 24 of arms AA in the assembled position will also function as electrical grounding tangs, as noted in FIG. 8.

In forming the retaining ring 18 from blank 19, the respective arms AA and BB are subjected to a series of progressive bending dies which will gradually bend the respective arms relative about a foldline f, which defines the face or front portion 20, whereby the arms AA and BB form a cup having circumscribing frustro-conical or outwardly flaring sides to define a ring which complements the conical surface S of the outlet end portion 11B, as seen in FIG. 1. In doing so, the locking tangs 22 are outwardly cantileverly bent or displaced relative to the surface of the ring at a slightly greater outwardly angle or slope than the adjacent grounding tangs 23 and the slope of arms AA. With the retaining ring so formed, it can be readily fitted onto the outlet end portion 11B whereby the inherent resiliency of the arms AA will cause the retainer slots 22 to snap fit onto the retaining lug 17 when slots 21 are placed in alignment with lugs 17. The arrangement is such that the retainer ring 18 will be firmly and positively secured to the outlet end portion 11B as seen in FIG. 8. Yet, due to the inherent resiliency of the material of the retaining ring 18, it can be easily detached from the outlet end portion 11B when removal is desired, without destroying the ring 18 by lifting arms AA free of the retaining lugs 17.

With the retainer ring 18 properly secured to the outlet end 11B of the connector body 11, the connector assembly 10 can be readily secured to an electric box 10 by simply aligning the assembly 10 with a knockout hole 14, as best seen in FIG. 7, and inserting the outlet end portion into the knockout hole 14 until the flange 13 engages the outer side of the electric box 15. In doing so, the respective tangs 22, 23 and the free ends 24 of arms AA will depress inwardly to permit insertion of the assembly 10. When the assembly is fully seated in the knockout hole 14, the locking tangs 22 will normally spring outwardly to secure the assembly 10 to the electric box 15, as noted in FIG. 9. The inherent resiliency of the grounding tangs 23, 23 and the free end 24 of arms AA are normally biased in engagement with the internal periphery of the knockout hole 14 to ensure a positive electrical ground with the electric box 15. The engagement of the free ends 24 of arms AA against the inner periphery of the knockout hole 14, as noted in FIG. 8, further ensures the firm securement of the retaining slot 21 with the retaining lugs 17, so as to prohibit any disengagement of the retaining ring 18 from the connector body 11.

It will be understood that the wire conductor 25 may be secured to the connector assembly 10 either before or after the assembly 10 has been secured to the electric box 15. In the illustrated embodiment, the conductor wire 25 is simply inserted into the inlet end portion 11A and secured in position by a suitable securing means. In the illustrated embodiment, the securing means is illustrated as a set screw 26. However, it will be understood that other conventional forms of securing means may be used, than the set screw 26 illustrated.

From the foregoing, it will be apparent that the disclosed connector assembly is quite novel and simple in construction. The snap fit retaining ring 18 can be simply formed from a cruciform shaped blank 19 whereby the opposed radially extending arms AA and BB can be readily formed into a cup having a generally frustro-conically shaped sidewalls complementing the slope of the outlet end portion 11A, and whereby the retainer ring 18 can be readily secured to the connector body simply by the inter-engagement of slots 21 with its complementary lugs 17.

In the assembled position, the retainer ring 18 is positively secured to the connector body in a manner to prohibit any unintentional separation. Also the tangs 22, 23, which are formed integral with ring 18, are shaped and formed so that the locking tangs 22 secure the assembly 10 to an electric box 15 while the grounding tangs 23 ensure a positive electrical ground of the assembly 10 with the associated electric box 15.

While the present invention has been described with respect to a particular embodiment, it will be understood that various modifications may be made without departing from the spirit or scope of the invention.

What is claimed is:

1. An electric connector assembly for securing an electrical conductor to an electric box comprising:
    a connector body having an inlet end portion, and an outlet end portion,
    and a bore extending therethrough,
    said outlet and portion terminating in an outlet opening for insertion through a knock out hole,
    said outlet end portion having an outer surface that slopes downward toward said outlet opening,
    a radially outward extending stop flange formed about an intermediate portion of said connector body,
    and a snap fit retaining ring having a face portion and an integrally connected circumscribing frustro-conical configuration wherein the diameter of the trailing end of said frustro-conical configuration is greater than the diameter of the leading end thereof,
    said circumscribing frustro-conical configuration includes a locking tang formed out of the surface of said ring and a grounding tang, whereby said locking tang is cantileverly bent radially outwardly relative to said grounding tang,
    and means for securing said retaining ring onto said downwardly sloped outlet end portion of said connector body.

2. An electrical connecting assembly as defined in claim 1 wherein said face portion includes a central opening therein.

3. An electrical connecting assembly as defined in claim 1 wherein said securing means includes an outwardly projecting lug formed on said downwardly sloping outlet end portion of said connector body, and
    said frustro-conical configuration having a retaining slot for receiving said projecting lug.

4. An electrical connector assembly for securing an electric conductor to a knockout hole of an electric box comprising:
    a connector body having an inlet end portion and an outlet end portion, and a bore extending therethrough, said outlet end portion terminating in an outlet opening adaptable for insertion through a knockout hole,
    a stop flange disposed intermediately of said connector body to limit the insertion of said outlet end portion into a knockout hole,
    said outlet end portion having an outer surface that slopes downward toward said outlet opening,
    a snap fit retainer ring being formed of a resilient material,
    said snap fit retainer ring having a face portion and an integrally connected frustro-conical configuration disposed about said face portion and extending laterally therefrom,
    a locking tang and a grounding tang formed out of the surface of said frustro-conical configuration,
    said locking tang being bent outwardly relative to the surface of said frustro-conical configuration at an angle greater than said grounding tang,
    said laterally extending frustro-conical configuration includes a trailing end having a diameter greater than that of said face portion whereby said locking tang and grounding tang are deflected inwardly to permit insertion of said connector assembly through a knockout hole, whereby said tangs are inherently biased outwardly when fully inserted, permitting the holding tang to secure the connector assembly to an electrical box and the grounding tang being positively biased in engagement with the internal periphery of the knockout hole to form a positive electrical ground.

5. An electrical connector assembly as defined in claim 4 and including means for securing said snap fit retainer ring onto the outlet end portion of said connector body.

6. An electrical connector assembled as defined in claim 5 wherein said securing means comprises:
    a projecting lug formed on said outlet end portion,
    and said frustro-conical configuration including a complementary slot for receiving said lug.

7. An electrical connector assembly as defined in claim 6 and including means for securing an electrical conductor when inserted into said inlet end portion.

8. An electrical connector assembly for securing an electrical conductor to an electrical box comprising:
    a connector body having an inlet end portion and an outlet portion with a bore extending therethrough,
    an outwardly extending flange circumscribing said connector body,
    said outlet end portion having a surface sloping downwardly toward the outlet end opening,
    a projecting lug formed on said eloping surface of said outlet end portion,
    a retaining ring disposed on said outlet end portion,
    said retaining ring having a face portion provided with an opening therein, and a plurality of laterally extending arms integrally connected about the periphery of said face portion,
    said laterally extending arms defining a frustro-conical configuration for receiving and circumscribing said outlet end portion,
    locking tangs and grounding tangs blanked out of the surface of said arms,
    said locking tangs being cantileverly bent out of the surface of said arms at an angle greater than said grounding tangs,
    a retaining slot formed in at least one of said arms,
    said rtaining slot adapted to receive said lug for securing said retaining ring on said outlet end portion.

9. A snap fit retainer ring adapted for use on an electrical connector to effect a snap fit connection to an electric box comprising:
    a blank of metallic spring material formed to define a ring,
    said blank having a central face portion and a plurality of opposed pairs of radial arms about said central face portion,
    said central face portion having an opening therein,
    said radially extending pairs of opposed arms being laterally bent about said face portion to define a frustro-conical configuration relative to said face portion,
    holding tangs formed out of the surface of opposed pairs of said arms,
    a retaining slot formed in another pair of said opposed arms,
    said holding tangs being cantileverly bent out of the surface of said opposed pairs of said arms, and said pairs of arms having the free ends thereof functioning as grounding tangs.

10. For use in combination with an electrical box provided with at least one or more knock out holes, an electrical connector assembly comprising:

a connector body defining an inlet end portion and a connected outlet end portion having an outlet opening, an outwardly radially extending flange circumscribing said connector body between said inlet portion and said outlet portion, said flange forming a stop to limit the insertion of said connector body portion through a knock out opening of the electrical box, said outlet portion having an outer surface sloping downwardly from said flange toward said outlet opening, a projecting lug formed on said sloping surface, a snap fit retainer ring supported on said outlet end portion, said snap fit retainer ring including a face portion and a plurality of pairs of opposed arms formed integral with said face portion, said plurality of pairs of opposed arms being laterally bent relative to and about said face portion to define a frustro-conical configuration circumscribing said face portion, locking tangs formed out of the surfaces of said opposed arms of at least one of said pairs of opposed arms, said locking tangs being cantileverly bent outwardly relative to the surface of said opposed arms of said one pair of opposed arms, and a second pair of opposed arms having a free end defining a grounding tang, a retaining slot formed in said second pair of arms arranged to receive said lug for securing said retainer ring onto said outlet end portion, so that when said connector assembly is inserted through a knockout hole of an electric box, said locking tangs spring outwardly to secure the connector assembly to the electric box and the ends of said second pair of opposed arms are biased to engage the inner periphery of the knockout hole to create an electrical ground.

* * * * *